E. A. RIOTTE.
INTERNAL COMBUSTION ENGINE.
APPLICATION FILED NOV. 19, 1921.
1,437,016.
Patented Nov. 28, 1922.
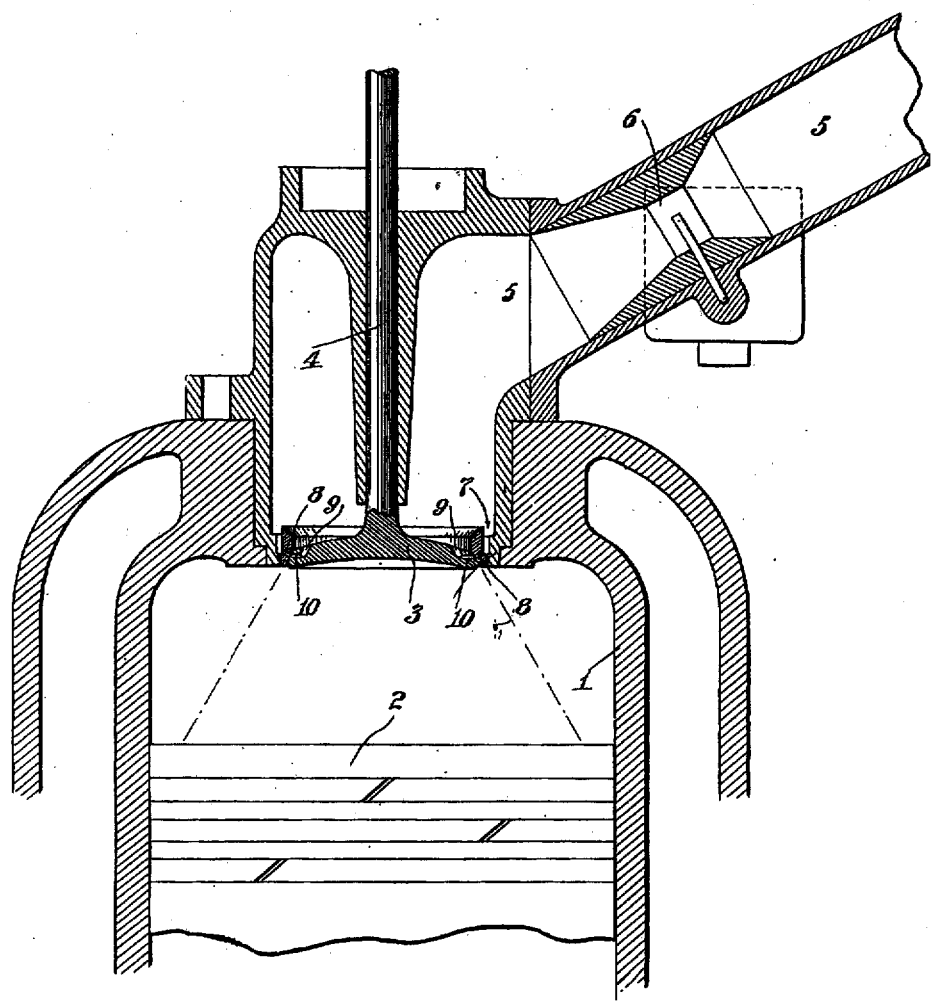

Patented Nov. 28, 1922.

1,437,016

UNITED STATES PATENT OFFICE.

EUGENE A. RIOTTE, OF MANHASSET, NEW YORK, ASSIGNOR TO STANDARD MOTOR CONSTRUCTION COMPANY, OF JERSEY CITY, NEW JERSEY, A CORPORATION OF NEW JERSEY.

INTERNAL-COMBUSTION ENGINE.

Application filed November 19, 1921. Serial No. 516,340.

*To all whom it may concern:*

Be it known that I, EUGENE A. RIOTTE, a citizen of the United States of America, residing at Manhasset, Long Island, Nassau County, N. Y., have invented a new and useful Internal-Combustion Engine, of which the following is a specification.

My invention relates to improvements in internal combustion engines, and is particularly useful in such engines as use the heavier hydrocarbons for fuel.

In the accompanying drawing I have illustrated in a single sectional view so much of an internal combustion engine as is needed for the purpose of making clear my invention.

In said drawing, 1 represents the upper end of a cylinder. 2 represents the head of a piston working in said cylinder. 3 represents an inlet valve in the head of the cylinder said valve being preferably placed in about the center thereof. 4 is the stem of valve 3, the same being mounted in the usual guide. 5 represents the inlet pipe, in which is located a suitable vaporizer 6. Liquid fuel is fed to the vaporizer by any of the well known means.

In the usual gas engine comprising the aforesaid parts, the fuel fed to the vaporizer is vaporized thereby on the suction stroke of the piston 2, and the vaporized fuel is conducted by the inlet pipe to and through the passage around valve 3, which is then opened. When a heavier hydrocarbon, such as kerosene, is used, great difficulty is experienced in keeping all of said fuel in the form of a mist in transit from the vaporizer to said valved passage. It has been found that when the mist strikes against the walls of the inlet pipe or passage beyond the vaporizer it tends to accumulate or collect thereon in solid liquid form and flows down the walls thereof and enters the cylinder in solid form which obviously produces imperfect combustion therein and causes sooting up of the walls of the cylinder head and the spark plug (not shown) commonly employed for ignition purposes. By reason of this fact, the heavier hydrocarbons cannot be successfully and efficiently employed in an ordinary internal combustion engine, whereas, if it were possible to keep all, or practically all of such fuel in a state of mist up to the time of ignition, it is manifest that the same would burn freely and thoroughly, and the aforesaid objections would be overcome.

My aim is to provide means to prevent the fuel from entering the cylinder in a solid state as distinguished from a finely divided or misty state. I further aim to direct said fuel into the cylinder in such a way that it will not tend to accumulate on the walls of the combustion chamber to a sufficient extent to produce harmful results. To that end, I so construct the valve seat, and by preference also the valve, so that any solid liquid accumulating on the walls of the intake pipe in the region of the valve (or upon the valve stem or guide) will be again broken up before actually entering the cylinder.

Referring again to the drawing, it will be seen that the lower end of the inlet pipe is constructed to provide a trough or channel 7 surrounding, and closely adjacent to, the valve seat proper. 8—8 are small ducts which lead from the channel 7 to the surface of the valve seat proper. It now follows that any accumulation of the liquid fuel in solid form on the walls of the intake pipe between the carbureter 6 and the valve 3 will run down said walls and be caught in the channel 7. From this channel the liquid will pass through the small ducts 8—8, which in effect operate as jets when the intake valve is open, so that the fuel escaping therefrom at the seat will be re-atomized, or converted into a mist, by the velocity of the air passing over said seat during the suction stroke of the engine.

I also preferably provide on the upper side of the valve 3 an annular channel 9 from which channel may be extended small ducts 10—10, which function in a manner corresponding to the channel 7 and ducts 8 respectively, the channel 9 and duct 10 catching any accumulation of liquid on the valve stem or guide. By this simple expedient, it is apparent that practically all of the fuel entering the cylinder must necessarily be in a finely divided or misty form which will burn freely and thoroughly to the great advantage of the engine.

It will also be noted, that I have so arranged the pitch of the valve seat and the co-acting face of the valve, that the direction of the fuel as it enters the cylinder will be more in line therewith than transverse thereof, that is to say, while in ordinary practice the valve seat is usually so flat that the entering fuel is mushroomed and directed toward the side walls of the cylinder close to the head, by my improvement, the vaporized fuel is directed in a course downwardly into the cylinder so near to its axis that it will not tend to accumulate on the walls of the combustion chamber in the cylinder head to a harmful degree. As a matter of fact, the pitch of the valve seat should be such that when the piston approaches the top of the compression stroke, the main body of the stream of fuel will be directed against the head of the piston rather than against the side walls of the cylinder. By this change in the pitch of the valve and valve seat greater efficiency can be attained than otherwise.

I have not attempted to show herein the usual parts commonly found in an internal combustion engine, such as the crankshaft, connecting rod, timing shaft, igniter, exhaust valve, and valve operating mechanism, because all of such features are well understood and may be freely employed, and of themselves contribute nothing to that which characterizes my present invention.

It will be noted that when the inlet valve is closed or seated, it will also close the ducts which communicate with the troughs, wherein the solid liquid fuel is accumulated, and hence such fuel can only escape from the troughs when the inlet valve is open, and then only through the small duct or ducts which operate as jets to guarantee the revaporizing of said fuel just before it enters the combustion chamber.

I deem it advantageous for convenience of manufacture and otherwise to make the valve seat in the form of a removable ring-like member, substantially as shown in the drawings, although this is not essential in all cases.

By the term "mist" as used herein, I mean a finely vaporized or atomized liquid fuel held in suspension in the air which goes to make up the combustible mixture.

I have found that an inlet valve having a pitch of approximately 60° when placed substantially in the center of the cylinder head will aid greatly in preventing an accumulation of solid liquid fuel on the top and side walls thereof in the region of the combustion chamber, but I do not wish to limit myself specifically to this precise angular pitch.

What I claim is:

1. In an internal combustion engine, a cylinder, an inlet pipe, an inlet valve and valve seat at the end of said pipe where it enters the cylinder, means adjacent to the inlet valve seat to collect solid liquid fuel accumulating on the internal walls of said pipe, and to convert the same into a mist directly at the entrance to said cylinder.

2. In an internal combustion engine, a cylinder having a combustion chamber, a pipe providing an inlet passage leading into said chamber, an inlet valve and seat between said combustion chamber and said passage, means adjacent to said inlet valve seat for collecting solid liquid fuel accumulating on the walls within said passage and for converting the same into a mist directly at the entrance to said combustion chamber.

3. In an internal combustion engine, a cylinder having a combustion chamber, a pipe providing an inlet passage leading into said chamber, an inlet valve and seat between said combustion chamber and said passage, means adjacent to said valve for collecting solid liquid fuel accumulating on the walls within said passage and for converting the same into a mist adjacent to the entrance to said combustion chamber comprising a trough and a duct leading therefrom to the surface adjacent the edge of the valve.

4. In an internal combustion engine, a cylinder having a combustion chamber, a pipe providing an inlet passage leading into said chamber, an inlet valve and seat between said combustion chamber and said passage, means adjacent to said valve for collecting solid liquid fuel accumulating on the walls within said passage and for converting the same into a mist adjacent to the entrance to said combustion chamber, comprising a channel in the wall of the inlet passage and a duct leading from said passage to the surface of the valve seat.

5. In an internal combustion engine, a cylinder having a combustion chamber, a pipe providing an inlet passage leading into said chamber, an inlet valve and seat between said combustion chamber and said passage, means adjacent to said valve for collecting solid liquid fuel accumulating on the walls within said passage and for converting the same into a mist adjacent to the entrance to said combustion chamber comprising a trough and a duct leading therefrom to the surface adjacent the edge of the valve, said valve operating to close said duct when said valve is seated.

6. In an internal combustion engine, a cylinder having a combustion chamber, a pipe providing an inlet passage leading into the upper portion of said chamber, an inlet valve and seat between said combustion chamber and said passage, a trough in the wall of said inlet pipe, and a trough in the upper side of said valve with ducts leading from said troughs to points adjacent to the edge of the valve in the region of the seat.

7. In an internal combustion engine, a cylinder having a combustion chamber, a pipe providing an inlet passage leading into the upper portion of said chamber, an inlet valve and seat between said combustion chamber and said passage, a trough in the wall of said inlet pipe, and a trough in the upper side of said valve with ducts leading from said troughs to points adjacent to the edge of the valve in the region of the seat, said valve closing said ducts when the same is seated.

8. In an internal combustion engine, a cylinder having a combustion chamber in its upper end, a piston movable up and down in said cylinder, a fuel inlet pipe leading into the upper central portion of said cylinder, a tapered valve and a correspondingly tapered seat therefor at the end of the inlet passage where the same enters said combustion chamber, the taper of said valve and seat being constructed to direct the main portion of the entering fuel against the head of the piston at the beginning of the suction stroke.

EUGENE A. RIOTTE.